US 12,079,174 B2

(12) United States Patent
Ahmed et al.

(10) Patent No.: US 12,079,174 B2
(45) Date of Patent: Sep. 3, 2024

(54) DATA RETRIEVAL FROM ARCHIVED DATA STORAGE

(71) Applicant: SAP SE, Walldorf (DE)

(72) Inventors: Naved Ahmed, Bangalore (IN); Shweta Gupta, Bangalore (IN)

(73) Assignee: SAP SE, Walldorf (DE)

( * ) Notice: Subject to any disclaimer, the term of this patent is extended or adjusted under 35 U.S.C. 154(b) by 62 days.

(21) Appl. No.: 17/732,966

(22) Filed: Apr. 29, 2022

(65) Prior Publication Data
US 2023/0350859 A1 Nov. 2, 2023

(51) Int. Cl.
| G06F 17/00 | (2019.01) |
| G06F 7/00 | (2006.01) |
| G06F 16/14 | (2019.01) |
| G06F 16/185 | (2019.01) |
| G06F 16/2458 | (2019.01) |
| G06F 16/28 | (2019.01) |

(52) U.S. Cl.
CPC .......... *G06F 16/185* (2019.01); *G06F 16/148* (2019.01); *G06F 16/2474* (2019.01); *G06F 16/282* (2019.01)

(58) Field of Classification Search
CPC .... G06F 16/185; G06F 16/148; G06F 16/282; G06F 16/2474
USPC ....................................................... 707/661
See application file for complete search history.

(56) References Cited

U.S. PATENT DOCUMENTS

| 5,701,461 A * | 12/1997 | Dalal ................ G06F 16/24539 |
| | | 707/999.01 |
| 7,539,672 B2 | 5/2009 | Khan et al. |
| 9,164,998 B2 | 10/2015 | Klevenz et al. |
| 9,639,538 B2 | 5/2017 | Fabijancic et al. |
| 10,430,413 B2 | 10/2019 | Christoph et al. |
| 10,620,860 B2 | 4/2020 | Dischinger et al. |
| 2003/0120665 A1* | 6/2003 | Fox ......................... G06F 16/25 |
| | | 707/999.1 |
| 2003/0229624 A1* | 12/2003 | Petrisor ................. G06F 16/953 |
| | | 707/999.003 |
| 2004/0107212 A1* | 6/2004 | Friedrich ................ G06F 16/25 |
| | | 707/999.104 |
| 2009/0083310 A1 | 3/2009 | Ballerini |
| 2020/0312159 A1* | 10/2020 | Hegranes ........... H04B 7/18506 |
| 2022/0335044 A1* | 10/2022 | Gupta .................. G06F 16/2471 |
| 2022/0382769 A1* | 12/2022 | Skinner ............. G06F 16/24578 |

\* cited by examiner

*Primary Examiner* — Pavan Mamillapalli
(74) *Attorney, Agent, or Firm* — Mintz Levin Cohn Ferris Glovsky and Popeo, P.C.

(57) ABSTRACT

A method, a system, and a computer program product for retrieving data from an archived data storage. A query requiring access to data stored in at least one storage location in the plurality of storage locations is received. Based on the received query, at least one first storage location storing the data is determined. One or more hierarchical data models for accessing data stored in the first storage location is generated. The hierarchical data models include a plurality of nodes storing at least a portion in a plurality of portions of the data stored in the first storage location. Using the generated hierarchical data models, a first data responsive to the query is selected and combined with at least a second data stored in at least another storage location in the plurality of storage locations. The combined first data and the second data are retrieved.

20 Claims, 14 Drawing Sheets

FIG. 6

*(rotated screenshot, 600)*

Customer Number: MY_CUST_T1  
Purpose: Test archived data  
Profile: NONE

- ∨ Purpose: Test archived data
  - ∨ General Data in Customer Master
    - ∨ Sales Document: Header Data
      - ☐ Pricing Elements
      - ☐ Pricing Elements [Archived] ← Archived records
      - ☐ Pricing Elements [Archived] ←
      - ☐ Pricing Elements
      - ☐ Sales Document: Business Data
      - ☐ Sales Document: Business Data [Archived]
    - ∨ Sales Document: Item Data
      - ☐ Sales Document: Business Data
      - ☐ Sales Document: Business Data [Archived] ←
      - ☐ Sales Document: Partner
      - ☐ Sales Document: Partner [Archived] ←
      - ☐ Sales Document: Partner [Archived]
      - ☐ Sales Document: Partner Details  
Show Hidden Fields

| Field Name | Field Value |
|---|---|
| Number of the Document Condition | 0000294776 |
| Origin of the Condition | Automatic pricing |
| Group Condition | |
| Access sequence - Access number | |
| Number of the Condition Record | |
| Sequential Number of the Condition | 000 |
| Account Key | |
| G/L Account Number | |
| Tax on Sales/Purchases Code | 000 |
| Account Key - Accruals / Provisions | ERL |
| Number of Accruals Account | |

Airline Code OF

Purpose    SAMPEL2           ✓ GO       Profiles  Cancel  More ∨

☐ Profile

∨ ☐ Purpose: SAMPEL2
  ∨ ☐ sflight
    ☐ Flight Details
    ☐ Flight Details
    ☐ Flight Details
    ☐ Flight Details
  ∨ ☐ <Data Collector>-1
    ☐ Flight Details    ⎫
    ☐ Flight Details    ⎬ Archived data retrieved via Data Collectors
    ☐ Flight Details    ⎭
    ☐ Flight Details Details Show Hidden Fields

| Field Name | Field Value | Mask | Hide |
|---|---|---|---|
| MANDT | 000 | ☐ | ☐ |
| CARRID | QF | ☐ | ☐ |
| CONNID | 0005 | ☐ | ☐ |
| FLDATE | 20200807 | ☐ | ☐ |
| PRICE |  | ☐ | ☐ |
| CURRENCY | AUD | ☐ | ☐ |
| PLANETYPE | 747-400 | ☐ | ☐ |
| SEATSMAX |  | ☐ | ☐ |

FIG. 8

Start Data Collection — 800

Refresh Purposes | Cancel | More ⌄

Data Subject ID Type
Data Subject ID
Language
Purpose
Profile
☐ Retrieve Archived Data Execute

DATA RETRIEVAL FROM ARCHIVED DATA STORAGE

TECHNICAL FIELD

This disclosure relates generally to data processing and, in particular, to an ability to retrieve data from archived storage in accordance with data privacy protection requirements.

BACKGROUND

Computing systems execute multitude of processes that rely on vast amounts of data that may be stored in various storage locations, such as, an archived data storage, a live database, etc. Data that may be required for execution of the processes may be queried and/or retrieved data from storage locations by each process, thereby making retrieval decentralized and cumbersome.

SUMMARY

In some implementations, the current subject matter relates to a computer-implemented method for retrieving data from an archived data storage. The method may include receiving, using at least one processor, a query requiring access to data stored in at least one storage location in the plurality of storage locations, determining, based on the received query, at least one first storage location storing the data, and generating one or more hierarchical data models for accessing data stored in the at least one first storage location. The hierarchical data models may include a plurality of nodes storing at least a portion in a plurality of portions of the data stored in the first storage location. The method may also include selecting using the one or more generated hierarchical data models, a first data responsive to the query and combining the selected first data with at least a second data stored in at least another storage location in the plurality of storage locations, and retrieving the combined first data and the second data.

In some implementations, the current subject matter may include one or more of the following optional features. In some implementations, at least one storage location may include at least one of the following: an archived date storage location storing archived data, a database storage location storing data being used by at least one application to execute at least one operation, and any combination thereof.

In some implementations, the first data may be stored in the archived data storage location, and the second data may be stored in the database storage location. In some implementations, the method may also include appending an identifier corresponding to storage locations in the plurality of storage locations storing the first data and the second data.

In some implementations, the first data may include at least one of the following: a table in a plurality of tables, a record in a plurality of records, a record stored in a table in the plurality of tables, and any combination thereof. One or more hierarchical data models may include at least one of the following: one or more lists of tables storing data responsive to the received query, one or more lists of records in a plurality of records responsive to the received query, and any combination thereof. In some implementations, one or more hierarchical data models may be generated using one or more archived data information structures representative of the archived data storage location.

In some implementations, the received query may include one or more parameters identifying one or more purposes for accessing the data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 is an exemplary user interface illustrating markers containing information about which data has been archived, according to some implementations of the current subject matter;

FIG. 7 is an exemplary user interface illustrating markers containing information about which data has been archived using the data collectors view, according to some implementations of the current subject matter;

FIG. 8 is an exemplary user interface that may be used for executing a data collection process shown in FIGS. 5a-c using the system shown in FIG. 3, according to some implementations of the current subject matter;

DETAILED DESCRIPTION

Figure 1:
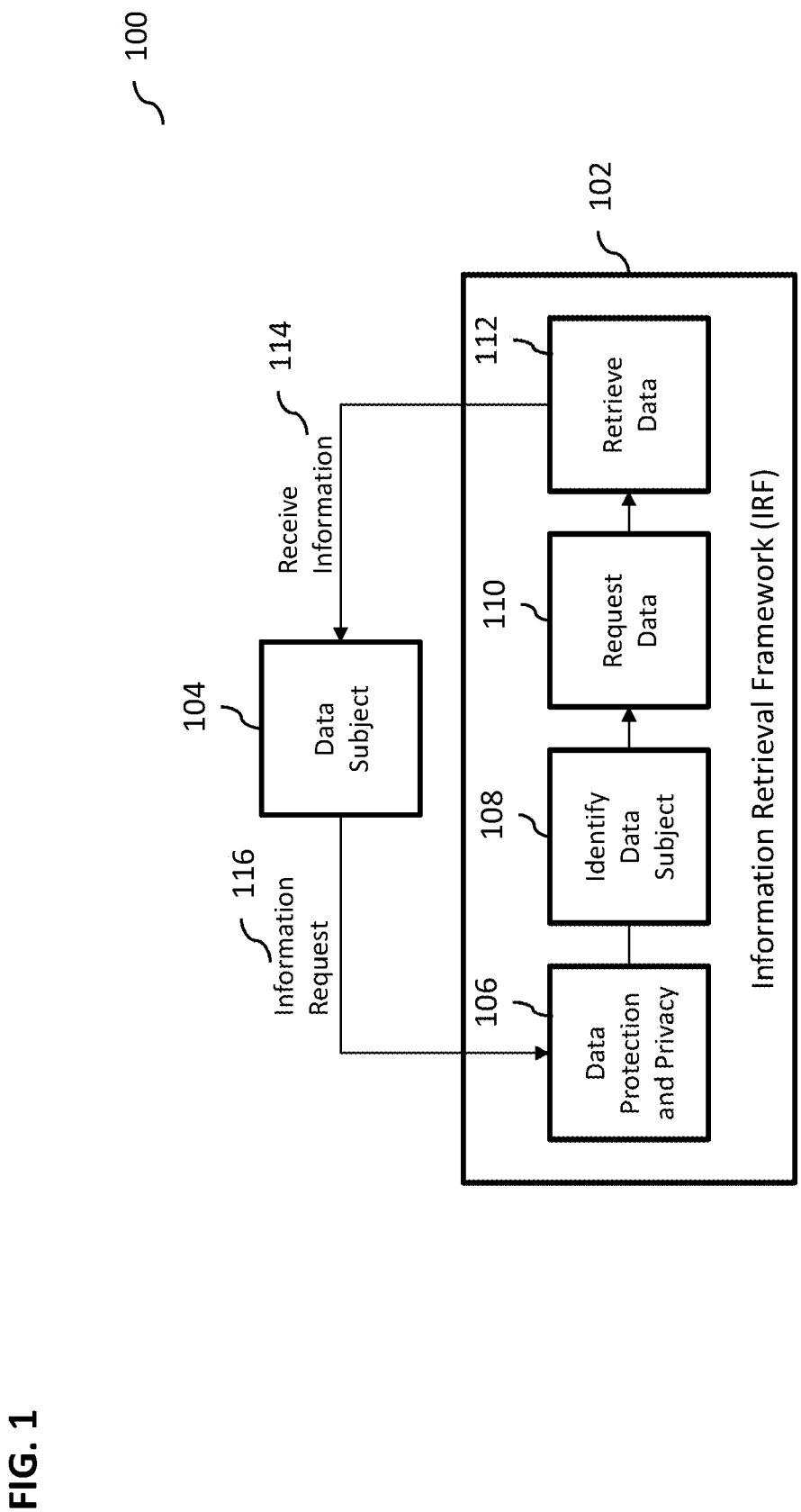
FIG. 1 illustrates an exemplary data retrieval system, according to some implementations of the current subject matter.

To address these and potentially other deficiencies of currently available solutions, one or more implementations of the current subject matter relate to methods, systems, articles of manufacture, and the like that can, among other possible advantages, provide an ability to retrieve data from archived data storage in accordance with data privacy protection requirements.

Information privacy, data privacy and/or data protection laws as well as various company-specific policies provide frameworks that control obtaining, using and storing data of persons (e.g., employees, patients, etc.). Various laws around the world describe the rights of such persons to control who is using their data, such as, for example, rights to obtain details on which data is stored, for what purpose and to request the deletion of any data in case the purpose is not given anymore. May countries around the world have enacted and/or adopted comprehensive data protection laws (e.g., European Union has the General Data Protection Regulation (GDPR)).

Companies also include corporate data protection and privacy (DPP) policies and requirements that may govern how data related to its products, users, etc. may be gathered/collected, stored, retrieved, etc. For example, some companies may provide data retrieval functions that may be used to inform data subjects (e.g., natural persons) about personal data stored that may be stored about them (which may comply with various requirements of enacted laws, e.g., GDPR, etc.).

The functions associated with retrieval of such personal data may be executed using an information retrieval framework (IRF) tool which may be configured to ensure compliance with various DPP policies. Personal data may be stored and/or present in one or more objects (e.g., business objects) that may be associated with one or more legal residence time periods (e.g., time during which objects may be accessible before they are transferred to archived data storage). Once the legal residence period expires, access to objects may be blocked and the objects may be transferred to archived data storage with a restricted access. Notwithstanding, archived data may also be retrieved and provided to a data subject in an information report.

Each application (via underlying object) may retrieve personal data from live databases and/or archived data storage, however, such retrieval process is typically complicated and, at times, may be extremely cumbersome. In some implementations, the current subject matter may be configured to provide an ability to retrieve, using IRF, archived data along with any unarchived data. Such retrieval may be executed from a central location and presented to a user by way of an information report. Further, the current subject matter may be configured to present archived and unarchived data in an appropriate context.

In some implementations, the current subject matter may be configured to provide each application seeking retrieval of archived and/or unarchived data using its own corresponding archive data read processes in accordance with application's functional requirements. Moreover, one or more application programming interfaces (APIs) may be reused for one or more data retrieval processes executed by one or more applications. Retrieval of archived data associated with different application may be unified irrespective of data schema and/or context. Additionally, any models used by the IRF may the same and/or similar to any archived data models.

FIG. 1 illustrates an exemplary data retrieval system 100. The system 100 may include an information retrieval framework 102 that may be accessed by one or more users (e.g., data subjects) 104. The information retrieval framework 102 may include a data protection and privacy component 106 (e.g., a DPP officer), a component 108 that may be used to identify a particular data subject (e.g., subject 104), a component 110 that may be used to request data associated with that data subject, and a component 112 that may be used to retrieve requested data.

The data subject 104 may be configure to transmit to the information retrieval framework a request 116 to retrieve information about it. The request 116 may be received and reviewed by the DPP component 106. The request 116 is then passed on to the component 108 to identify the data subject 104. Once the subject 104 is identified by the framework 102, the data about the subject 104 may be requested using component 110. The component 112 then retrieves the data that has been requested. The data may be retrieved from one or more databases and may include archived and unarchived (or "live") data. Upon retrieval, an information report 114 may be generated by the framework 102 and transmitted to the data subject 104.

In some cases, application data may be archived for volume management and/or for DPP blocking requirements. Access to the archived data may be restricted using one or more authorization objects. Each application may be configured to define an archived object (AO) to enable the archiving process. The archived object may include an archive data model (e.g., archiving table set) along with one or more read/write/delete processes. The archived data may be accessed using at least one of the following: a sequential read (which may be performance intensive), an index-based read (e.g. which may be optimized), and any combination thereof. The index-based read may require one or more archive infostructure(s) to be generated. Each archived object may be associated with one or more archive infostructure(s) based on one or more functional requirements. Further, archived data may be stored as a list of records.

Figure 2:
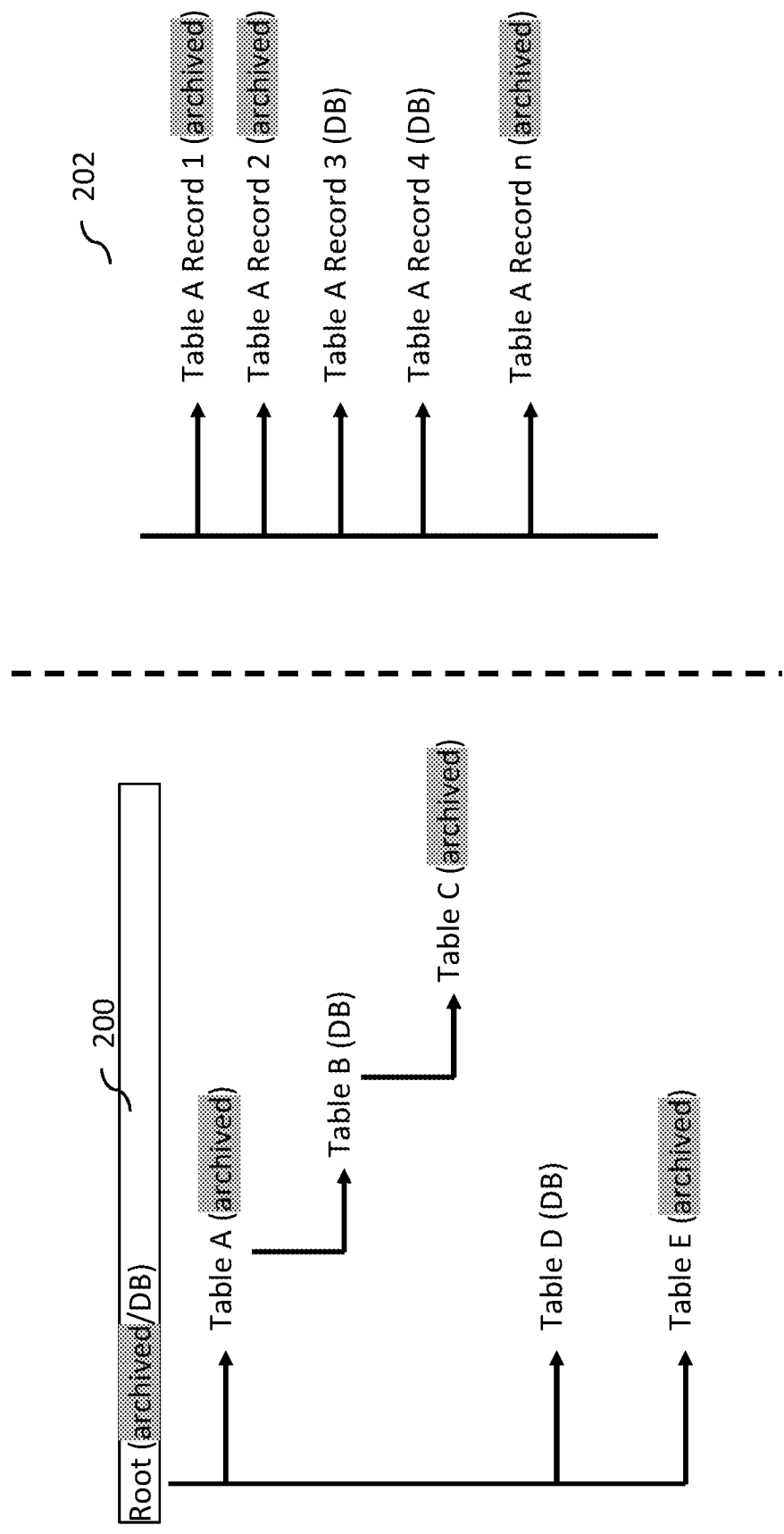
FIG. 2 illustrates an exemplary archived data models that may be used to store archived data, according to some implementations of the current subject matter.

FIG. 2 illustrates an exemplary archived data models 200 and 202 that may be used to store archived data. The data model 200 may be configured in a form a table hierarchy, where tables may be stored in an archived data storage location and/or a live database (DB). The hierarchical data model 200 may include a Root node and one or more child nodes. The child nodes may include a Table A (stored in an archived storage location) and Table D (stored in a live database location) and Table E (stored in the archived storage location). Table A may also include further child nodes, e.g., Table B (stored in the live database location), which also may also include a Table C (stored in the archived storage location) as a child node.

The archived data model 202 may include table records that may be stored in the archived Table A shown in the archived data model 200. Some records in Table A may be stored in the archived data storage location (e.g., Record 1, Record 2, and Record n), while others may be in the live database storage location (e.g., Record 3 and Record 4).

Figure 3:
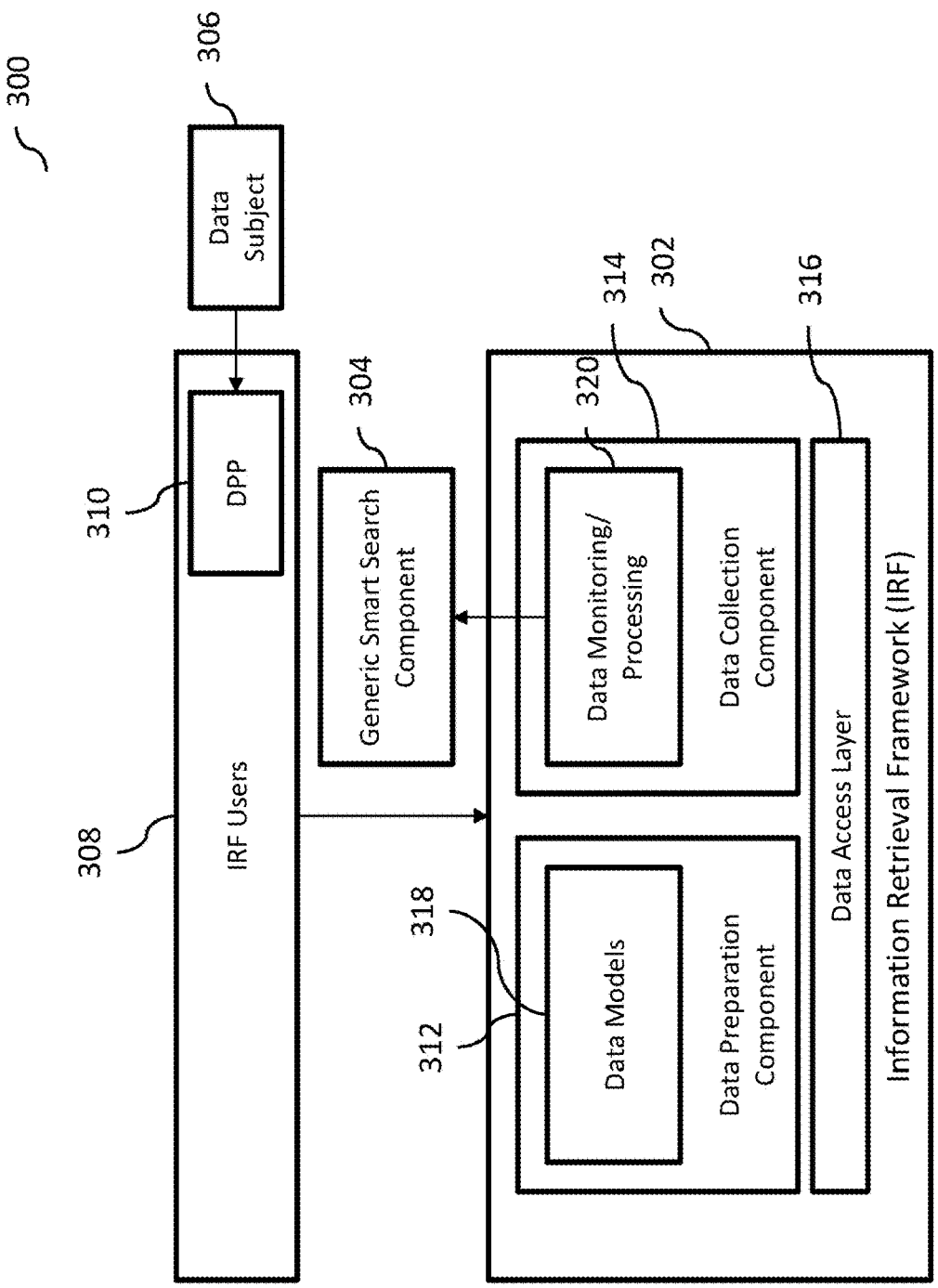
FIG. 3 illustrates an exemplary information data retrieval framework system, according to some implementations of the current subject matter.

FIG. 3 illustrates an exemplary information data retrieval framework system 300, according to some implementations of the current subject matter. The system 300 may be used to retrieve data about a data subject 306 (e.g., similar to data subject 104 shown in FIG. 1), where the data may be an archived data stored in or more archived storage locations and/or live data that may be stored in one or more live databases. The live database(s) may store data that is currently being used, accessed, updated, etc. by a particular application. The system include an information retrieval framework component 302 (similar to framework 102 shown in FIG. 1), a generic smart search component 304, and one or more users 308. The users 308 may include a data protection and privacy component 310 (e.g., similar to component 106 shown in FIG. 1). The component 302 may further include a data preparation component 312 that may include one or more data models 318 (e.g., data generation, data view, data validation, data adjustment, etc. models), a data collection component 314 that may include one or more data monitoring/processing components 320 (e.g., an information report display, personalization, download, etc. components), and a data access layer component 316.

The system 300 may be configured to provide access and/or retrieval of various information, data, files, signals, etc., which may include at least one of the following: a video, an audio, an image, a graphics data, a text data, and/or any other information, data, file, signal that may or may not include a video, an audio, an image, a graphics data, a text data, and/or any other data file. This data may be associated and/or otherwise related to the data subject 306 and/or may be processed, used, etc. by one or more applications (not shown in FIG. 3).

The system 300 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 300 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 300 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

Figure 4:
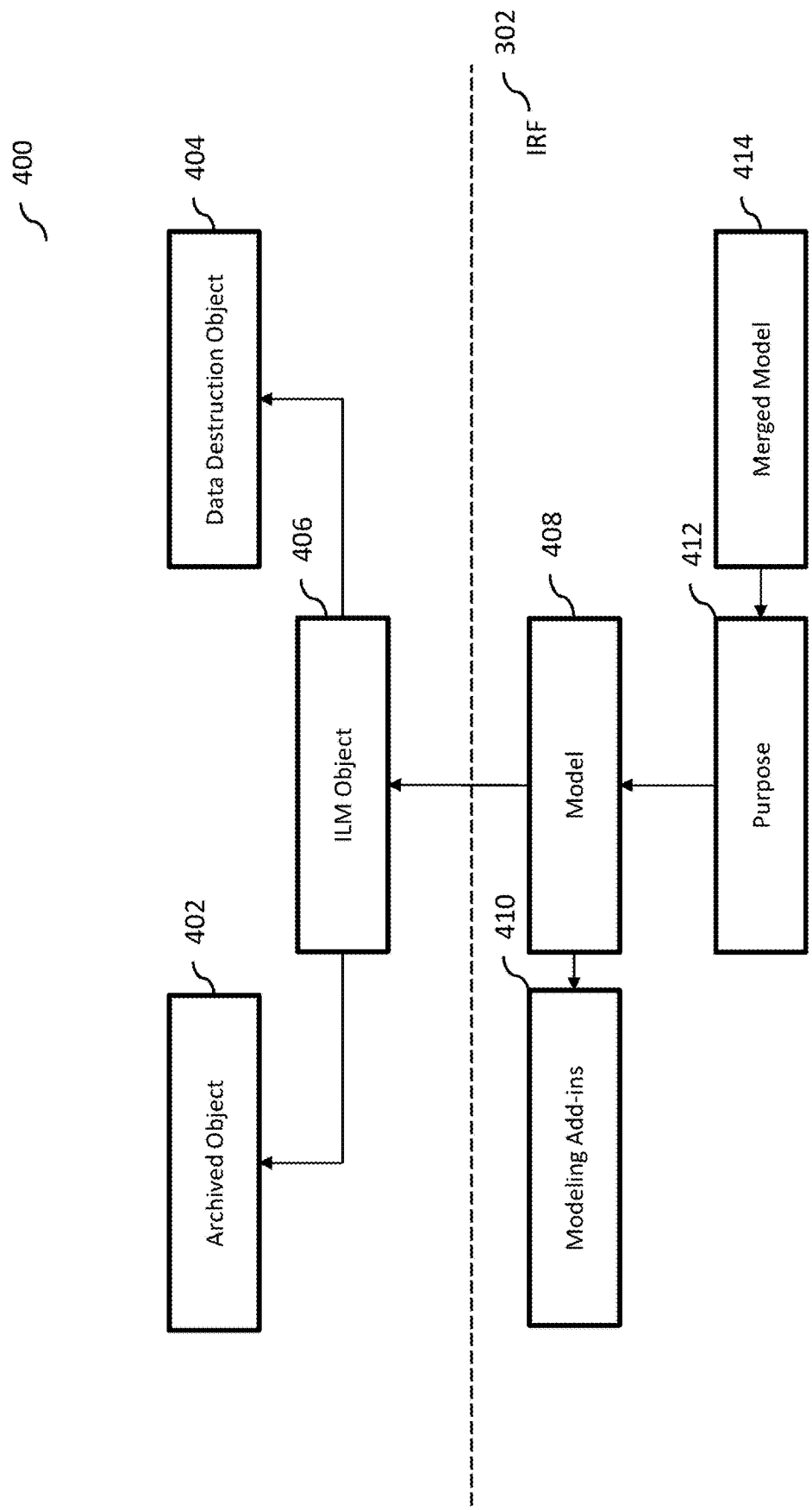
FIG. 4 illustrates an exemplary process for retrieval of information using an information retrieval framework, e.g., information retrieval framework shown in FIG. 3, according to some implementations of the current subject matter.

FIG. 4 illustrates an exemplary process 400 for retrieval of information using an information retrieval framework, e.g., information retrieval framework 302 shown in FIG. 3, according to some implementations of the current subject matter. For the purposes of data retrieval, in the information retrieval framework 302, a merged model 414 may be generated for all data objects having a particular purpose 412. An information retrieval framework model 408 may then be generated for all such objects with one or more modeling add-in components 410. An information lifecycle management object 406 may be generated based on the information retrieval framework model 408. The object 408 may then be mapped to either a data destruction object (DO) 404 and/or a data archived object (AO) 402.

Referring to FIGS. 3-4, to retrieve data relating to a particular data subject 306, using the system 300, the information retrieval framework 302 may be configured to perform identification of the data subject. As stated above the merged model 414 may be used to execute model-based retrieval for all data objects having a particular purpose 412, which may be associated with the data subject 306 and/or applications executing various processes involving data associated with the data subject 306.

The generic smart search component 304 may be configured to generate one or more table data tree models (e.g., models 200, as shown in FIG. 2). The table data tree models may include one or more nodes configured to represent a table containing all records (e.g., as associated with a particular data subject 306) of that table. Using the IRF model 408, the generic smart search component 304 may be configured to execute a search of data records contained in the table(s) by navigating from one table level to the next (e.g., from Root to Table A to Table B to Table C, etc. in the model 200 shown in FIG. 2 and/or from Record 1 to Record 2, etc. in the model 202 shown in FIG. 2) in the table hierarchy. Data (that may be associated with the subject 306) may be selected from the live database storage location and/or archived data storage location and fetched. In some cases, the fetched data may be transformed into a compressed format, which may be helpful in the event the data is too voluminous.

The information retrieval framework 302 may then prepare an intelligible records tree (e.g., similar to the tree model 202 shown in FIG. 2), where the table data tree (e.g., tree model 200 shown in FIG. 2) may be expanded to show all records in each table, where each node may represent a record and may be mapped to its correct parent record. If the records are compressed, then the information retrieval framework 302 may be configured to decompress the data received from the generic smart search component 304. Moreover, record level mapping may be generated to establish how the data is mapped between tables, records, etc. Additionally, the information retrieval framework 302 may be configured to further augment any technical data with various descriptions (e.g., for human readability).

The information retrieval framework 302 may be configured to execute one or more calls to the data collection components 314 that may be implemented by applications for data collection. Applications may be configured to return any data and/or hierarchy information to generate an intelligible records tree.

In some implementations, the current subject matter may be configured to provide a computing engine that may be configured to retrieve archived data and/or any live database data and present it, e.g., in a form an information report, to the user, such as, for display, download, etc. The current subject matter may be configured to implement one or more information lifecycle management (ILM) objects 406 that may be mapped to one or more archived objects 402 and/or destruction objects 404 which may include one or more data models associated with one or more data objects (e.g., table and/or field relationships). The current subject matter may be configured to generate one or more information retrieval framework models 408 based on one or more ILM objects 406, which, in turn, may be enhanced using one or more modeling add-ins 410. Moreover, a purpose object 412 that may represent an end-to-end scenario may be mapped to multiple IRF models 408. The current subject matter may then execute one or more data collection processes in view of the particular purpose 412 using an underlying merged model 414, which may represent a search tree across one or more models. Further, the IRF models 408 may be mapped to one or more information structures (infostructures) that may exist and/or have been established in the archived data storage. This may allow such IRF models 408 to be enhanced with the archival information. Further, any archived data may be included into the GSS model-based data selection using such enhanced IRF model 408. Any subsequent data retrieval operations may treat the data similarly that may be stored in the live database and/or archived data storage.

Figure 5A:
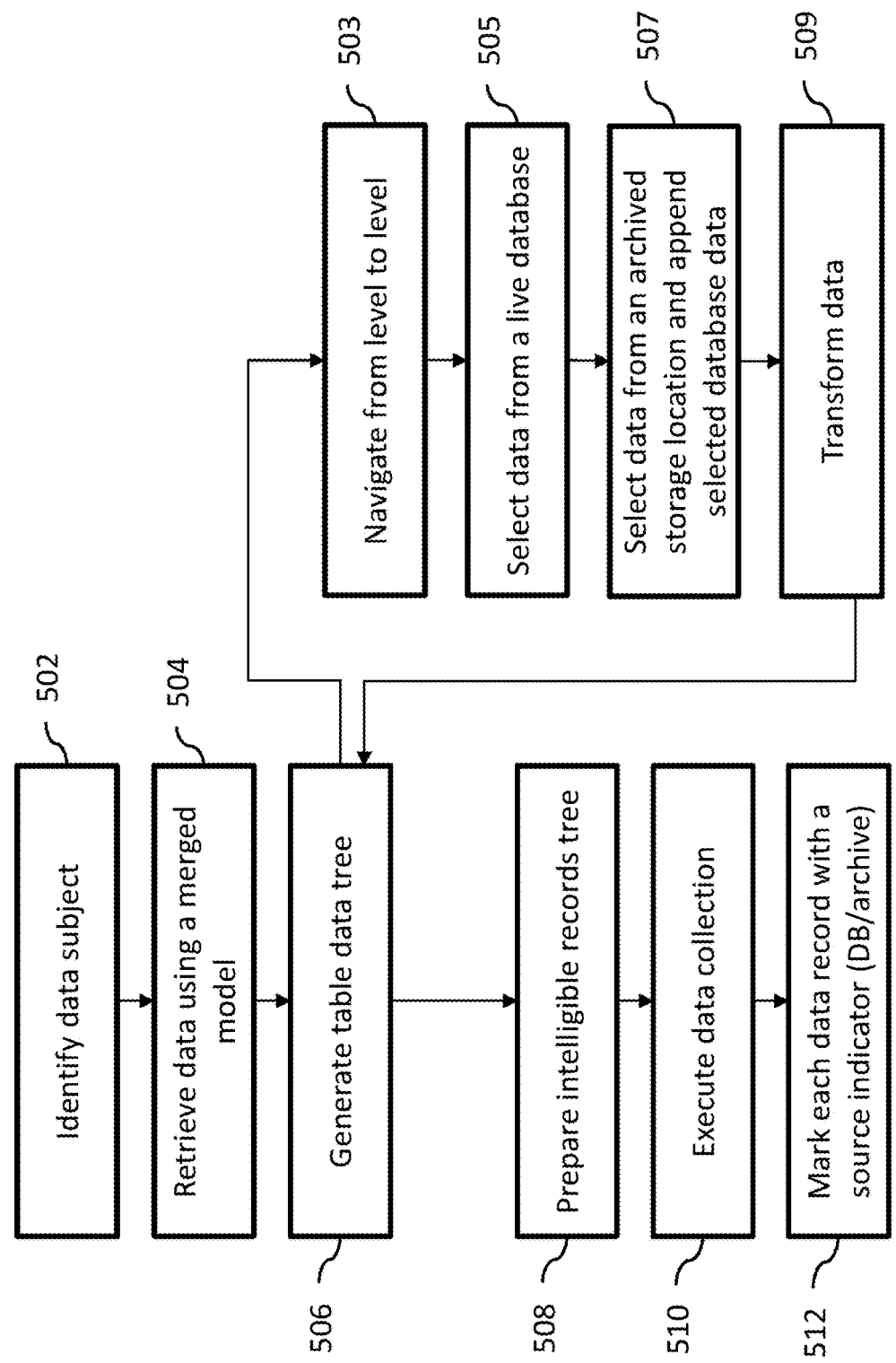
FIG. 5a illustrates an exemplary process for retrieval of data from archived storage, according to some implementations of the current subject matter.

FIG. 5a illustrates an exemplary process 500 for retrieval of data from archived storage, according to some implementations of the current subject matter. The process 500 may be executed by one or more components of the system 300 shown in FIG. 3 in response to receiving a query to retrieve data associated with a particular data subject. The data may be stored in one or more archived storage location (e.g., cold storage) and/or a live database (e.g., hot storage). In particular, one or more operations of the process 500 may be executed by the information retrieval framework component 302 (e.g., using data preparation component 312 and/or data collection component 314 and/or data access layer 316) and/or generic smart search component 304.

At 502, a particular data subject (e.g., data subject 306) about which data may be sought may be identified in the archived data storage. The data sought may be associated with a particular purpose (e.g., purpose 412 shown in FIG. 5c). The data about the data subject may be retrieved using a predetermined model, at 504. The model may be a merged model (e.g., merged model 414 shown in FIG. 5c) that may include one or more tables, fields, etc. that may be linked. One or more objects associated with the data sought and the particular purpose may be retrieved from archived data storage. The purpose may be any defined purpose (e.g., travel destinations, airlines used, credit card purchases at a particular retailer, etc.). In some implementations, the information retrieval framework component 302 (e.g., using component 312) may be configured to perform processes associated with identifying data associated with the data subject for which data is sought. The data subject may be any object (e.g., a particular user, a process, an application, etc.).

At 506, as part of the data preparation process, the process 500 may proceed to generate a table data tree based on the data stored in the archived data storage. The table data tree may be generated using generic smart search component 304 (shown in FIG. 3). The table data tree may include one or more nodes that may be related to the data subject, the purpose, and/or any other objects associated with the data subject. Each node in the table data tree may include one or more tables that may include one or more or all data records of that table.

The generic smart search component 304 may be configured to use information framework retrieval component's model 408 to search/navigate between levels (e.g., from one level to next level), at 503, in the generated table data tree to ascertain presence of relevant data records in the archived data storage in response to the query. At 505, the generic smart search component 304 may be configured to access live database storage to determine presence of relevant data responsive to the query in the live database storage. If such data exists, the component 304 may be configured to select it for preparation of a response to the query (e.g., for inclusion in an information report).

At 507, the component 304 may be configured to select data from the archived data storage that may be responsive to the query and that may have been identified as being related to the data subject. Any data from the live database storage that has been selected (at 505) may be appended to the data selected from the archived data storage.

Figure 5B:
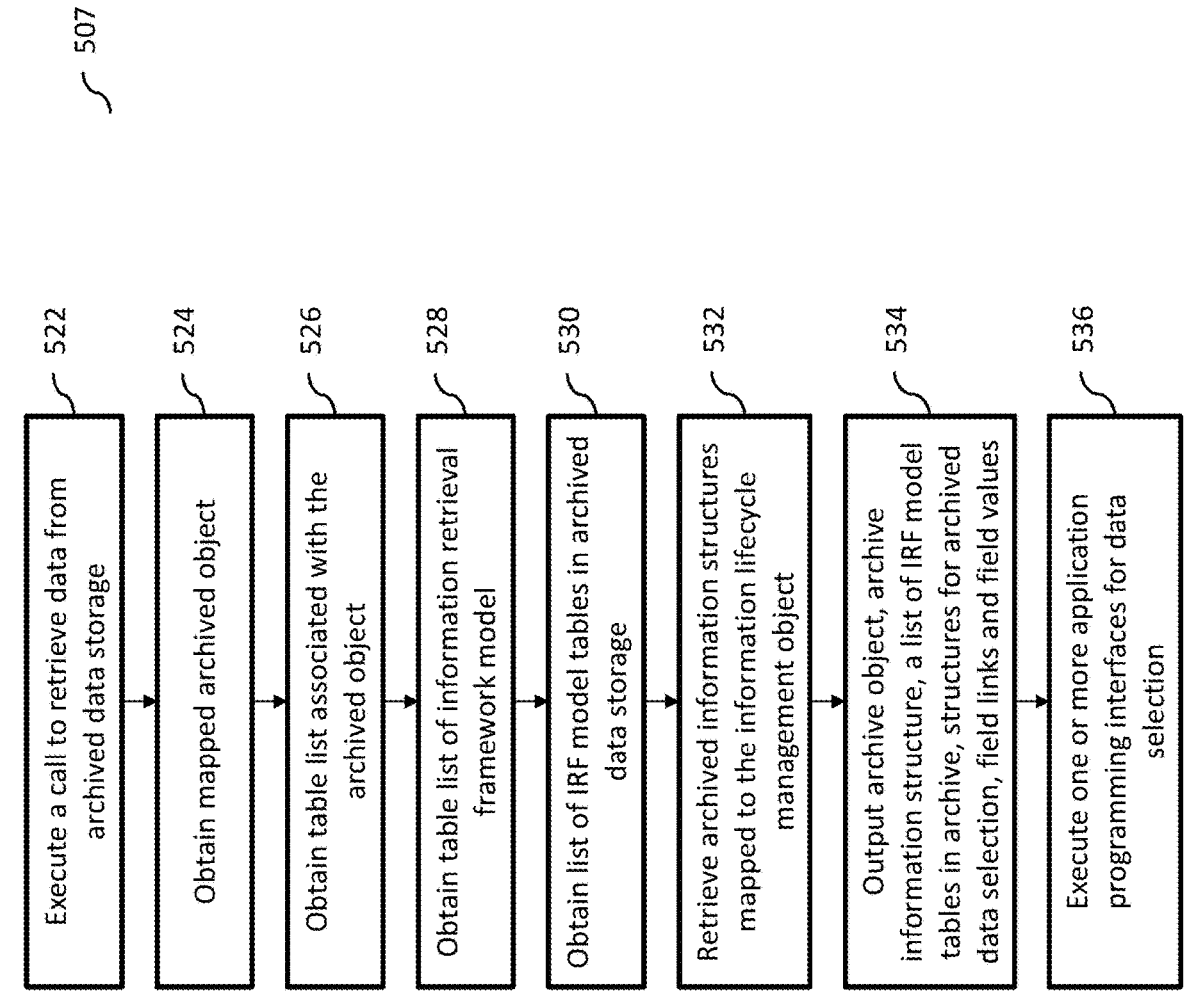
FIG. 5b illustrates further details of the selection process shown in FIG. 5a, according to some implementations of the current subject matter.

FIG. 5b illustrates further details of the selection process (at 507 shown in FIG. 5a). At 522, the component 304 may be configured to execute a call to retrieve data from the archived data storage. As input, the component 304 may be configured to receive an identification of a purpose for which the data about the data subject is sought (e.g., one or more parameters, etc.), one or more tables, one or more field links, and/or field values related to the data records stored in the archived data storage.

Figure 5C:
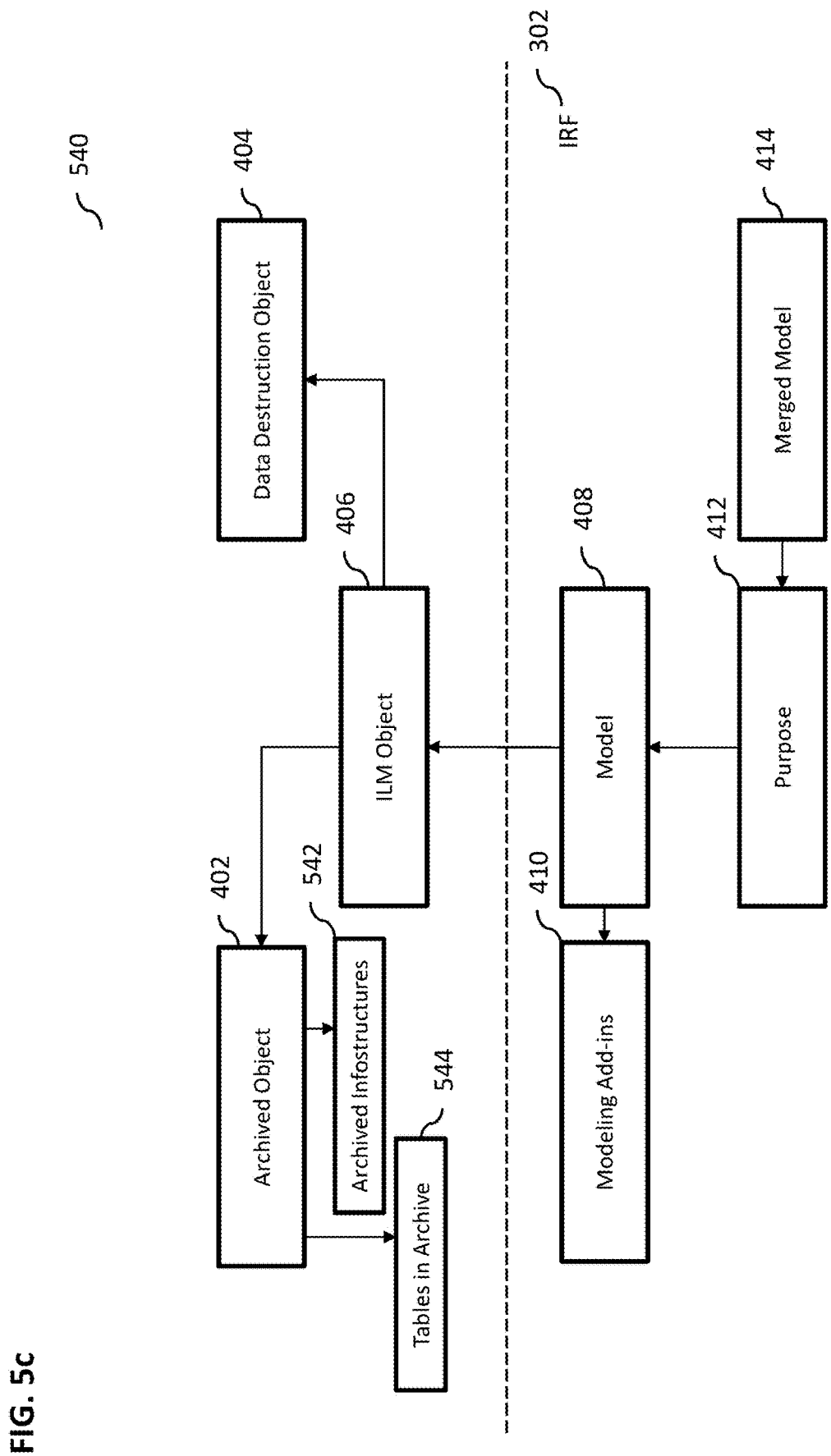
FIG. 5c illustrates an exemplary process for retrieval of information using an information retrieval framework, according to some implementations of the current subject matter.

At 524, the process 507 may be configured to be further executed by the information framework retrieval component 302, which may receive the above input. The process 507 may be configured to be executed for each information lifecycle management object (e.g., ILM object 406 as shown in FIG. 5c Using the received input, the component 302 may be configured to obtain and/or retrieve an archived object (e.g., archived object 402 as shown in FIG. 5c) that may include a mapping of the various data records contained in it, at 524. The retrieved archived object may be responsive to the received query. A list of tables (e.g., tables 544 as shown in FIG. 5c) contained in the archived object 402 may also be obtained, at 526.

At 528, a table list containing one or more tables associated with the information framework retrieval component's model (e.g., model 408 as shown in FIG. 5c) may be retrieved. An intersection of the two lists (i.e., a list of tables in the archived object and the IRF model tables) may be obtained, at 530. One or more information structures (e.g., infostructures 542 shown in FIG. 5c) that may be mapped to the information lifecycle management object may be obtained, at 532. For each archived information structure, an updated list of IRF model tables stored in the archived data storage may be obtained. This information may be transmitted to the component 304, which may generate an output that may include an archived object, archived information structure, a list of IRF model tables stored in the archived data storage, structures for the archived data selection, one or more field links, one or more field values, and/or any other data, at 534. One or more modeling add-ins (e.g., add-ins 410 shown in FIG. 5c) may be used to augment any IRF models with archiving information. The component 304 may also be configured to execute one or more application programming interfaces (APIs) to allow selection of specific data that may be sought about the data subject, at 536.

Referring back to FIG. 5a, the output generated by the component 304 may be transmitted to one or more APIs in a compressed format, at 509. This may be helpful in managing large volumes of data that may be responsive to the received query. The process 500 may then proceed back to the information framework retrieval component 302. At 508, using the generated table data tree (at 506), the component 302 (e.g., using component 312) may be configured to generate one or more intelligible records tree, at 508. The intelligible records tree may be configured to be an expanded version of the generated table data tree, in which each node may be configured to represent a record and may be mapped to its correct parent record. To generate such intelligible records tree, the component 302 may be configured to, optionally, decompress any data received from component 304 (assuming such data was compressed). The component 302 may be further configured to generate a data record level mapping, where each data record may be mapped to its correct parent by moving up to the root node of the tree. The component 302 may further augment each data record with additional information (e.g., technical data with multilingual descriptions for readability).

At 510, the component 302 may be configured to execute one or more data collection processes (e.g., using data collection components 314). For example, the component 302 may be configured to execute one or more calls to data collection components 314 that may be implemented by one or more applications for data collection. Applications may return data as well as hierarchy information to generate the intelligible records tree. At 512, any retrieved data records may be marked in accordance with its source, e.g., archived, database, etc. As shown in FIG. 2, each record and/or table in the IRF model may be marked with appropriate indicator. For example, Table A in the model 200 may be marked as being archived (e.g., "Archived"), while Table B may marked as being in the live database (e.g., "DB"). Similarly, in the model 202, Table A Record 1 and Table A Record 2 may be marked as being archived, while Table A Record 3 and Table A Record 3 may be marked as being in the live database.

FIG. 6 is an exemplary user interface 600 illustrating markers containing information about which data has been archived, according to some implementations of the current subject matter. For example, the archived data records may be indicated using "[Archived]" indicator. The data records that do not include such indicator are stored in the live database.

Similarly, FIG. 7 is an exemplary user interface 700 illustrating markers containing information about which data has been archived using the data collectors view, according to some implementations of the current subject matter. As shown in FIG. 7, the flight records under "<Data Collector>-1" category have been archived.

FIG. 8 is an exemplary user interface 800 that may be used for executing a data collection process (e.g., as shown in FIGS. 5a-c) using the system 300 (as shown in FIG. 3), according to some implementations of the current subject matter. As shown in FIG. 8, the user interface 800 may include one or more fields that may be completed to initiate search for data records associated with a data subject. Such fields may include, but are not limited to, "data subject ID type", "data subject ID", "language", "purpose", "profile", and a box for requesting retrieval of archived data.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 9:
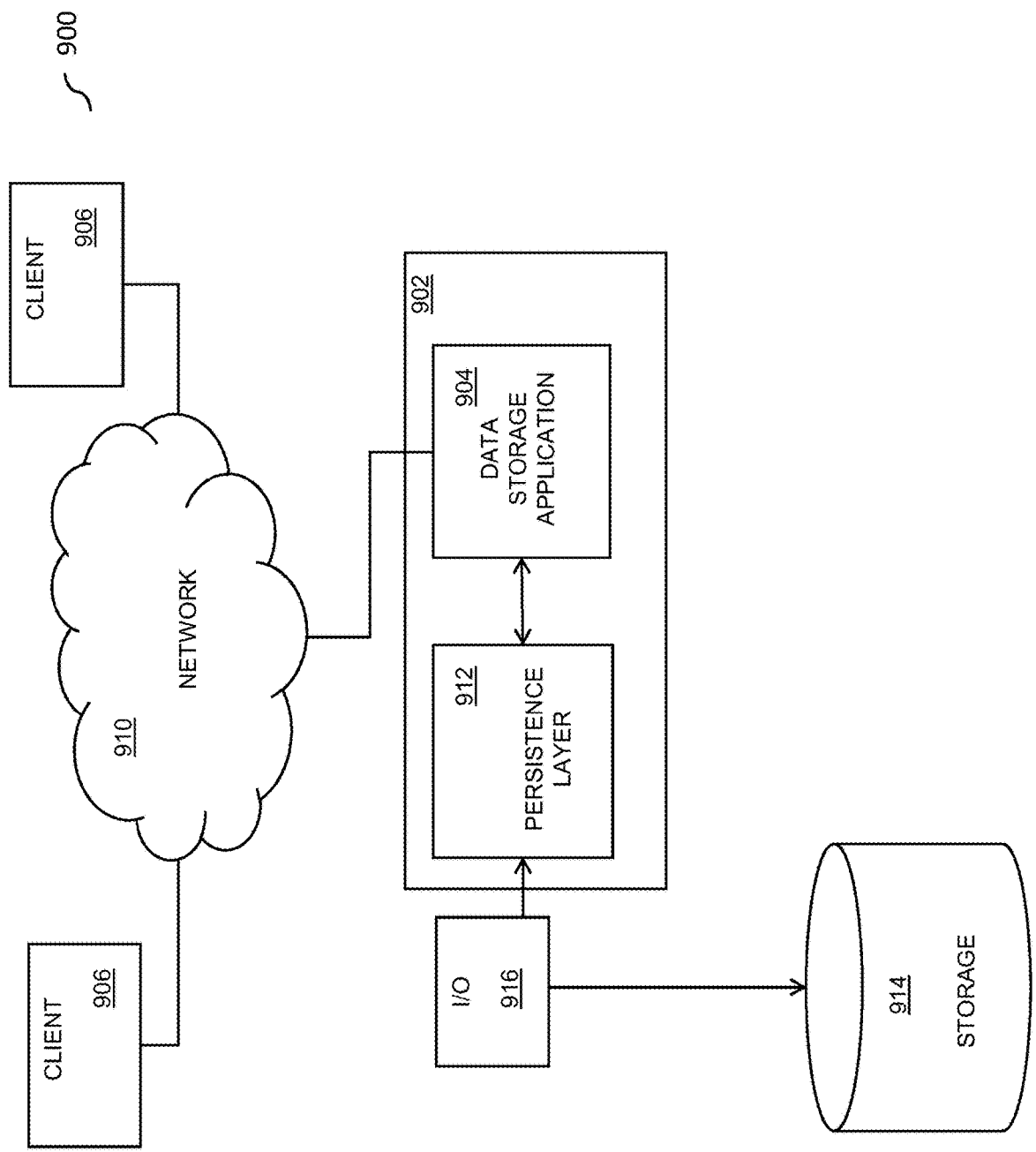
FIG. 9 is a diagram illustrating an exemplary system including a data storage application, according to some implementations of the current subject matter.

FIG. 9 illustrates an exemplary system 900 in which a computing system 902, which may include one or more programmable processors that may be collocated, linked over one or more networks, etc., executes one or more modules, software components, or the like of a data storage application 904, according to some implementations of the current subject matter. The data storage application 904 may include one or more of a database, an enterprise resource program, a distributed storage system (e.g. NetApp Filer available from NetApp of Sunnyvale, CA), or the like.

The one or more modules, software components, or the like may be accessible to local users of the computing system 902 as well as to remote users accessing the computing system 902 from one or more client machines 906 over a network connection 910. One or more user interface screens produced by the one or more first modules may be displayed to a user, either via a local display or via a display associated with one of the client machines 906. Data units of the data storage application 904 may be transiently stored in a persistence layer 912 (e.g., a page buffer or other type of temporary persistency layer), which may write the data, in the form of storage pages, to one or more storages 914, for example via an input/output component 916. The one or more storages 914 may include one or more physical storage media or devices (e.g. hard disk drives, persistent flash memory, random access memory, optical media, magnetic media, and the like) configured for writing data for longer term storage. It should be noted that the storage 914 and the input/output component 916 may be included in the computing system 902 despite their being shown as external to the computing system 902 in FIG. 9.

Data retained at the longer term storage 914 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 10:
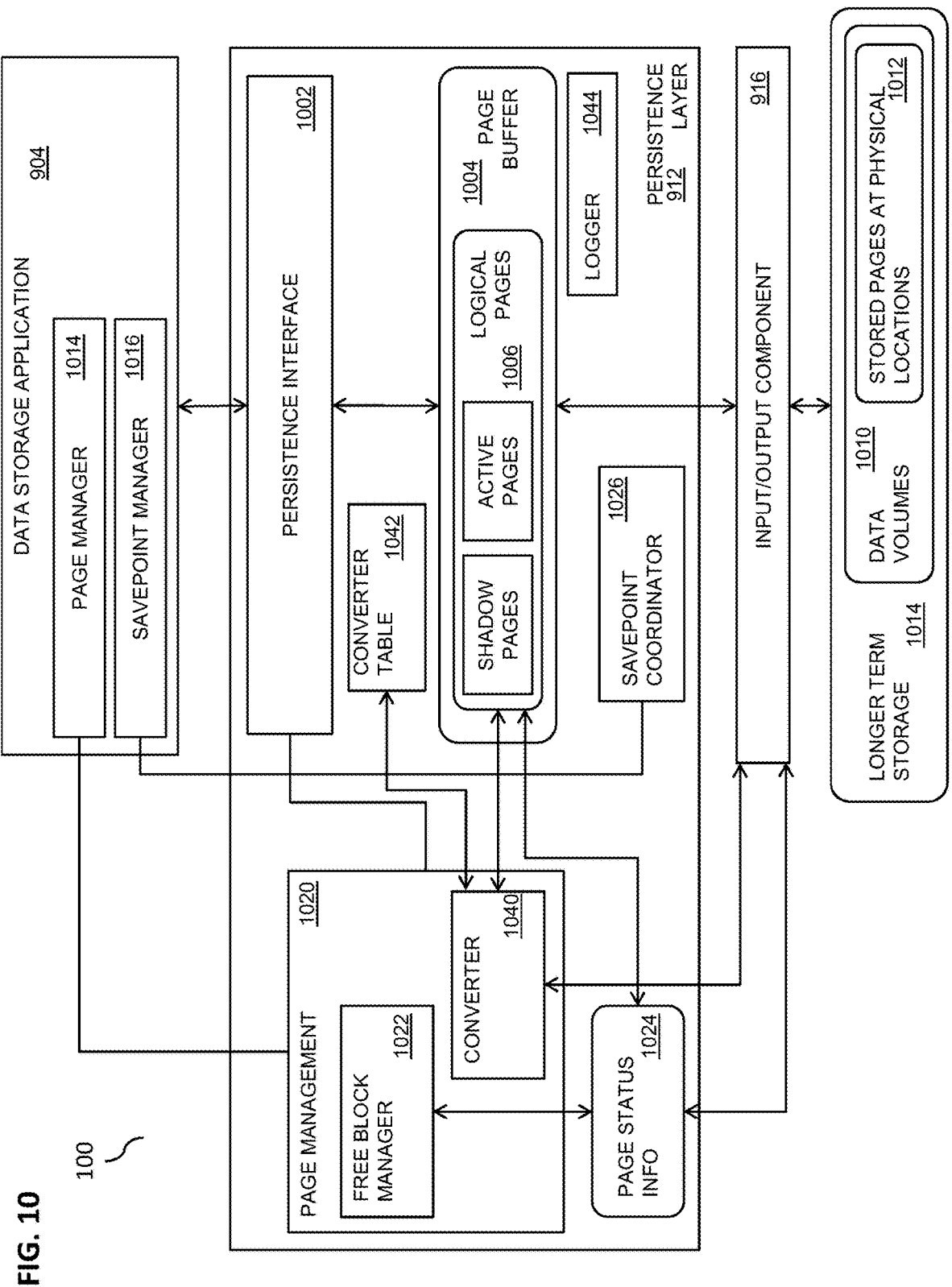
FIG. 10 is a diagram illustrating details of the system of FIG. 9.

FIG. 10 illustrates exemplary software architecture 1000, according to some implementations of the current subject matter. A data storage application 904, which may be implemented in one or more of hardware and software, may include one or more of a database application, a network-attached storage system, or the like. According to at least some implementations of the current subject matter, such a data storage application 904 may include or otherwise interface with a persistence layer 912 or other type of memory buffer, for example via a persistence interface 1002. A page buffer 1004 within the persistence layer 912 may store one or more logical pages 1006, and optionally may include shadow pages, active pages, and the like. The logical pages 1006 retained in the persistence layer 912 may be written to a storage (e.g. a longer term storage, etc.) 914 via an input/output component 916, which may be a software module, a sub-system implemented in one or more of software and hardware, or the like. The storage 914 may include one or more data volumes 1010 where stored pages 1012 are allocated at physical memory blocks.

In some implementations, the data storage application 904 may include or be otherwise in communication with a page manager 1014 and/or a savepoint manager 1016. The page manager 1014 may communicate with a page management module 1020 at the persistence layer 912 that may include a free block manager 1022 that monitors page status information 1024, for example the status of physical pages within the storage 914 and logical pages in the persistence layer 912

(and optionally in the page buffer 1004). The savepoint manager 1016 may communicate with a savepoint coordinator 1026 at the persistence layer 912 to handle savepoints, which are used to create a consistent persistent state of the database for restart after a possible crash.

In some implementations of a data storage application 904, the page management module of the persistence layer 912 may implement a shadow paging. The free block manager 1022 within the page management module 1020 may maintain the status of physical pages. The page buffer 1004 may include a fixed page status buffer that operates as discussed herein. A converter component 1040, which may be part of or in communication with the page management module 1020, may be responsible for mapping between logical and physical pages written to the storage 914. The converter 1040 may maintain the current mapping of logical pages to the corresponding physical pages in a converter table 1042. The converter 1040 may maintain a current mapping of logical pages 1006 to the corresponding physical pages in one or more converter tables 1042. When a logical page 1006 is read from storage 914, the storage page to be loaded may be looked up from the one or more converter tables 1042 using the converter 1040. When a logical page is written to storage 914 the first time after a savepoint, a new free physical page is assigned to the logical page. The free block manager 1022 marks the new physical page as "used" and the new mapping is stored in the one or more converter tables 1042.

The persistence layer 912 may ensure that changes made in the data storage application 904 are durable and that the data storage application 904 may be restored to a most recent committed state after a restart. Writing data to the storage 914 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 1044 may also be included to store the changes made to the data of the data storage application in a linear log. The logger component 1044 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 1044 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 912 may use a combination of undo log entries (from one or more logs) and shadow paging.

The persistence interface 1002 may handle read and write requests of stores (e.g., in-memory stores, etc.). The persistence interface 1002 may also provide write methods for writing data both with logging and without logging. If the logged write operations are used, the persistence interface 1002 invokes the logger 1044. In addition, the logger 1044 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1044. For an entry of type "update", for example, this would be the identification of the affected record and the after image of the modified data.

When the data application 904 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 1044 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 1044 may write a database log (or simply referred to herein as a "log") sequentially into a memory buffer in natural order (e.g., sequential order, etc.). If several physical hard disks/storage devices are used to store log data, several log partitions may be defined. Thereafter, the logger 1044 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 904 may use shadow paging so that the savepoint manager 1016 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 11:
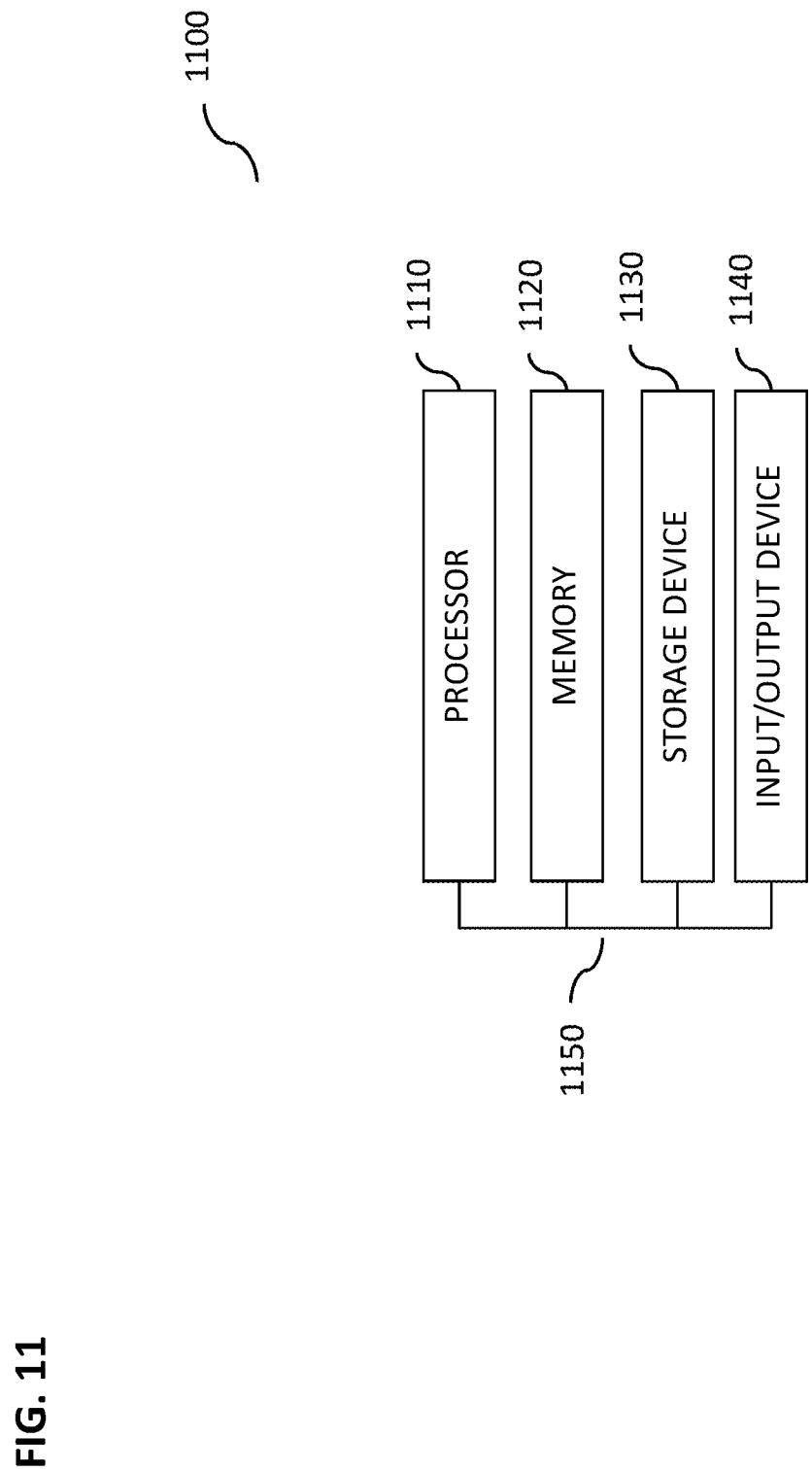
FIG. 11 is an exemplary system, according to some implementations of the current subject matter.

In some implementations, the current subject matter may be configured to be implemented in a system 1100, as shown in FIG. 11. The system 1100 may include a processor 1110, a memory 1120, a storage device 1130, and an input/output device 1140. Each of the components 1110, 1120, 1130 and 1140 may be interconnected using a system bus 1150. The processor 1110 may be configured to process instructions for execution within the system 1100. In some implementations, the processor 1110 may be a single-threaded processor. In alternate implementations, the processor 1110 may be a multi-threaded processor. The processor 1110 may be further configured to process instructions stored in the memory 1120 or on the storage device 1130, including receiving or sending information through the input/output device 1140. The memory 1120 may store information within the system 1100. In some implementations, the memory 1120 may be a computer-readable medium. In alternate implementations, the memory 1120 may be a volatile memory unit. In yet some implementations, the memory 1120 may be a non-volatile memory unit. The storage device 1130 may be capable of providing mass storage for the system 1100. In some implementations, the storage device 1130 may be a computer-readable medium. In alternate implementations, the storage device 1130 may be a floppy disk device, a hard disk device, an optical disk device, a tape device, non-volatile solid state memory, or any other type of storage device. The input/output device 1140 may be configured to provide input/output operations for the system 1100. In some implementations, the input/output device 1140 may include a keyboard and/or pointing device. In alternate implementations, the input/output device 1140 may include a display unit for displaying graphical user interfaces.

Figure 12:
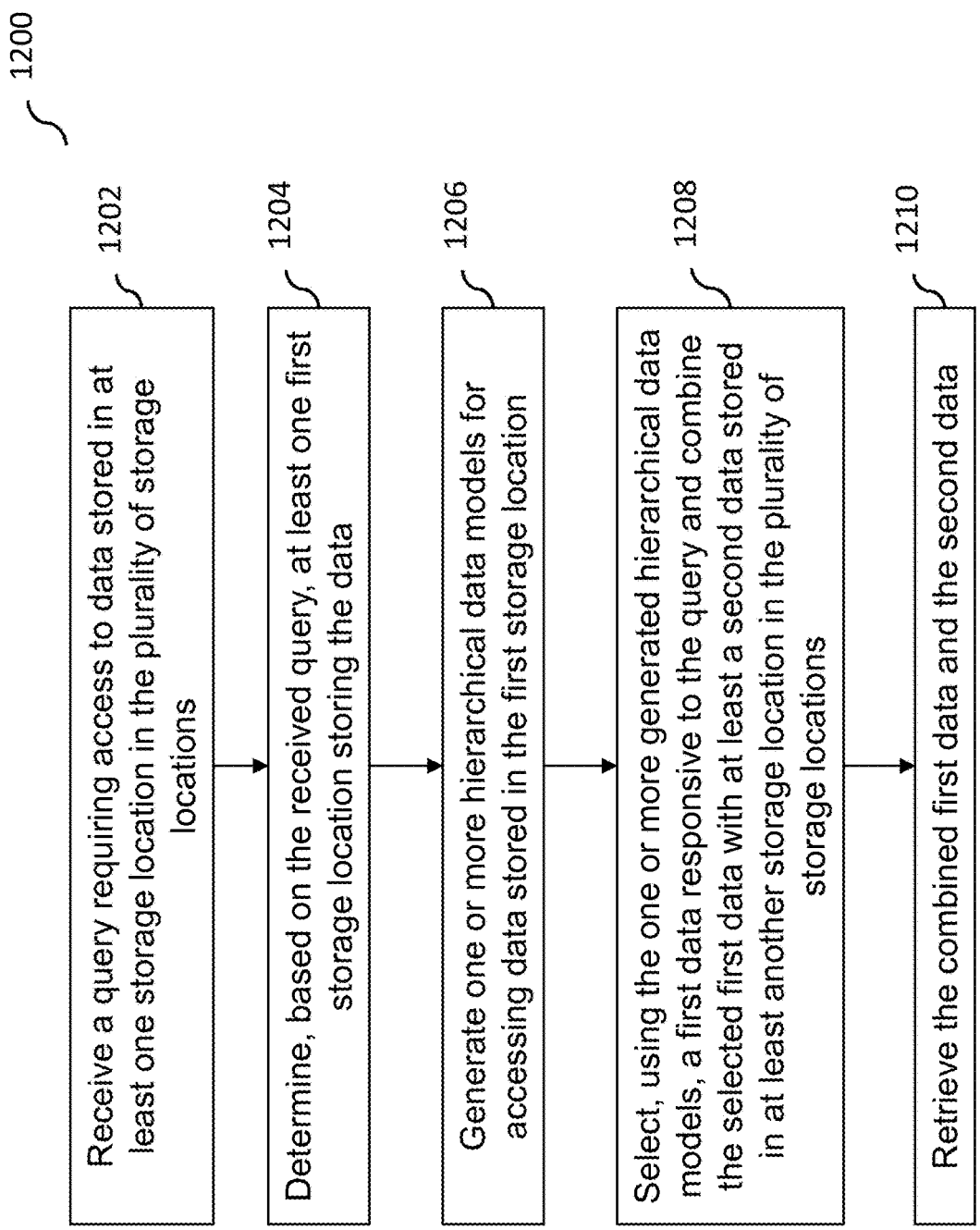
FIG. 12 is an exemplary method, according to some implementations of the current subject matter.

FIG. 12 illustrates an exemplary method 1200 for retrieving data from an archived data storage, according to some implementations of the current subject matter. The method 1200 may be executed using the system 300 and in particular, the information framework retrieval component 302 (including its data preparation component 312 and data collection component 314) implementing one or more operations discussed in connection with FIGS. 5*a-c*. The method 1200 may be used to access and/or retrieve data, responsive to a query, from a central location, where the data may be stored in an archived data storage location (e.g., storing data that is no longer being actively used by one or more applications to execute a particular process) and/or a live database (e.g., storing data that is being actively used by one or more applications to execute one or more processes). The data sought may be related to a particular data subject (e.g., data subject 306 as shown in FIG. 3). At 1202, a query requiring access to data stored in at least one storage location in the plurality of storage locations may be received by the IRF component 302 (as shown in FIG. 3). At 1204, at least one first storage location storing the data may be determined based on the received query. For example, the data may be stored in the archived data storage location and/or in a live database location.

At 1206, one or more hierarchical data models for accessing data stored in at least one first storage location may be generated. The models may be generated by the GSS component 304. The hierarchical data models may include a plurality of nodes storing at least a portion in a plurality of portions of the data stored in the first storage location.

At 1208, the component 304 may be used to select, using the one or more generated hierarchical data models, a first data responsive to the query and combine the selected first data with at least a second data stored in at least another storage location in the plurality of storage locations. For example, the component 304 may append the live database data to the selected archived data.

At 1210, the combined first data and the second data may be retrieved. The combined data may be also presented for downloading and/or displaying on a user interface.

In some implementations, the current subject matter may include one or more of the following optional features. In some implementations, at least one storage location may include at least one of the following: an archived date storage location storing archived data, a database storage location storing data being used by at least one application to execute at least one operation, and any combination thereof.

In some implementations, the first data may be stored in the archived data storage location, and the second data may be stored in the database storage location. In some implementations, the method may also include appending an identifier corresponding to storage locations in the plurality of storage locations storing the first data and the second data.

In some implementations, the first data may include at least one of the following: a table in a plurality of tables, a record in a plurality of records, a record stored in a table in the plurality of tables, and any combination thereof. One or more hierarchical data models may include at least one of the following: one or more lists of tables storing data responsive to the received query, one or more lists of records in a plurality of records responsive to the received query, and any combination thereof. In some implementations, one or more hierarchical data models may be generated using one or more archived data information structures representative of the archived data storage location.

In some implementations, the received query may include one or more parameters identifying one or more purposes for accessing the data.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving, using at least one processor, a query requiring access to data stored in at least one storage location in a plurality of storage locations;
   determining, using the at least one processor, based on the received query, at least one first storage location storing the data;
   generating, using the at least one processor, one or more hierarchical data models for accessing data stored in the at least one first storage location, the one or more generated hierarchical data models including a first hierarchical data model having a plurality of nodes storing at least a portion in a plurality of portions of the data stored in the at least one first storage location;
   selecting, using the at least one processor, using the one or more generated hierarchical data models, a first data responsive to the query and combining the selected first data with at least a second data stored in at least one second storage location in the plurality of storage locations; and
   retrieving, using the at least one processor, the combined first data and the second data.

2. The method according to claim 1, wherein the at least one storage location includes at least one of the following: an archived date storage location storing archived data, a database storage location storing data being used by at least one application to execute at least one operation, and any combination thereof.

3. The method according to claim 2, wherein the first data is stored in the archived data storage location, and the second data is stored in the database storage location.

4. The method according to claim 3, further comprising appending an identifier corresponding to storage locations in the plurality of storage locations storing the first data and the second data.

5. The method according to claim 3, wherein the first data includes at least one of the following: a table in a plurality of tables, a record in a plurality of records, a record stored in a table in the plurality of tables, and any combination thereof.

6. The method according to claim 3, wherein the first hierarchical data model is a table data tree, and wherein each node in the table data tree includes one or more tables.

7. The method according to claim 6, further comprising generating an intelligible records tree from the table data tree, wherein the intelligible records tree is an expanded version of the table data tree, and wherein at least a first node of the intelligible records tree represents a record which is mapped to a parent record.

8. The method according to claim 1, wherein the received query includes one or more parameters identifying one or more purposes for accessing the data.

9. A system comprising:
   at least one programmable processor; and
   a non-transitory machine-readable medium storing instructions that, when executed by the at least one programmable processor, cause the at least one programmable processor to perform operations comprising:
      receiving a query requiring access to data stored in at least one storage location in a plurality of storage locations;

determining based on the received query, at least one first storage location storing the data;

generating one or more hierarchical data models for accessing data stored in the at least one first storage location, the one or more generated hierarchical data models including a first hierarchical data model having a plurality of nodes storing at least a portion in a plurality of portions of the data stored in the at least one first storage location;

selecting using the one or more generated hierarchical data models, a first data responsive to the query and combining the selected first data with at least a second data stored in at least one second storage location in the plurality of storage locations; and retrieving the combined first data and the second data.

10. The system according to claim 9, wherein the at least one storage location includes at least one of the following: an archived date storage location storing archived data, a database storage location storing data being used by at least one application to execute at least one operation, and any combination thereof.

11. The system according to claim 10, wherein the first data is stored in the archived data storage location, and the second data is stored in the database storage location.

12. The system according to claim 11, further comprising appending an identifier corresponding to storage locations in the plurality of storage locations storing the first data and the second data.

13. The system according to claim 11, wherein the first data includes at least one of the following: a table in a plurality of tables, a record in a plurality of records, a record stored in a table in the plurality of tables, and any combination thereof.

14. The system according to claim 11, wherein the first hierarchical data model is a table data tree, and wherein each node in the table data tree includes one or more tables.

15. The system according to claim 14, wherein the instructions, when executed by the at least one programmable processor, cause the at least one programmable processor to perform further operations comprising generating an intelligible records tree from the table data tree, wherein the intelligible records tree is an expanded version of the table data tree, and wherein at least a first node of the intelligible records tree represents a record which is mapped to a parent record.

16. The system according to claim 9, wherein the received query includes one or more parameters identifying one or more purposes for accessing the data.

17. A computer program product comprising a non-transitory machine-readable medium storing instructions that, when executed by at least one programmable processor, cause the at least one programmable processor to perform operations comprising:

receiving, using at least one processor, a query requiring access to data stored in at least one storage location in a plurality of storage locations;

determining, using the at least one processor, based on the received query, at least one first storage location storing the data;

generating, using the at least one processor, one or more hierarchical data models for accessing data stored in the at least one first storage location, the one or more generated hierarchical data models including a first hierarchical data model having a plurality of nodes storing at least a portion in a plurality of portions of the data stored in the at least one first storage location;

selecting, using the at least one processor, using the one or more generated hierarchical data models, a first data responsive to the query and combining the selected first data with at least a second data stored in at least one second storage location in the plurality of storage locations; and retrieving, using the at least one processor, the combined first data and the second data.

18. The computer program product according to claim 17, wherein the at least one storage location includes at least one of the following: an archived date storage location storing archived data, a database storage location storing data being used by at least one application to execute at least one operation, and any combination thereof;

wherein the first data is stored in the archived data storage location, and the second data is stored in the database storage location.

19. The computer program product according to claim 18, further comprising appending an identifier corresponding to storage locations in the plurality of storage locations storing the first data and the second data.

20. The computer program product according to claim 19, wherein the first data includes at least one of the following: a table in a plurality of tables, a record in a plurality of records, a record stored in a table in the plurality of tables, and any combination thereof.

* * * * *